May 4, 1965 H. F. PARKER 3,182,140
CODING UNIT FOR CONVEYOR SYSTEMS WITH READOUT MECHANISM
Filed May 5, 1960 6 Sheets-Sheet 1
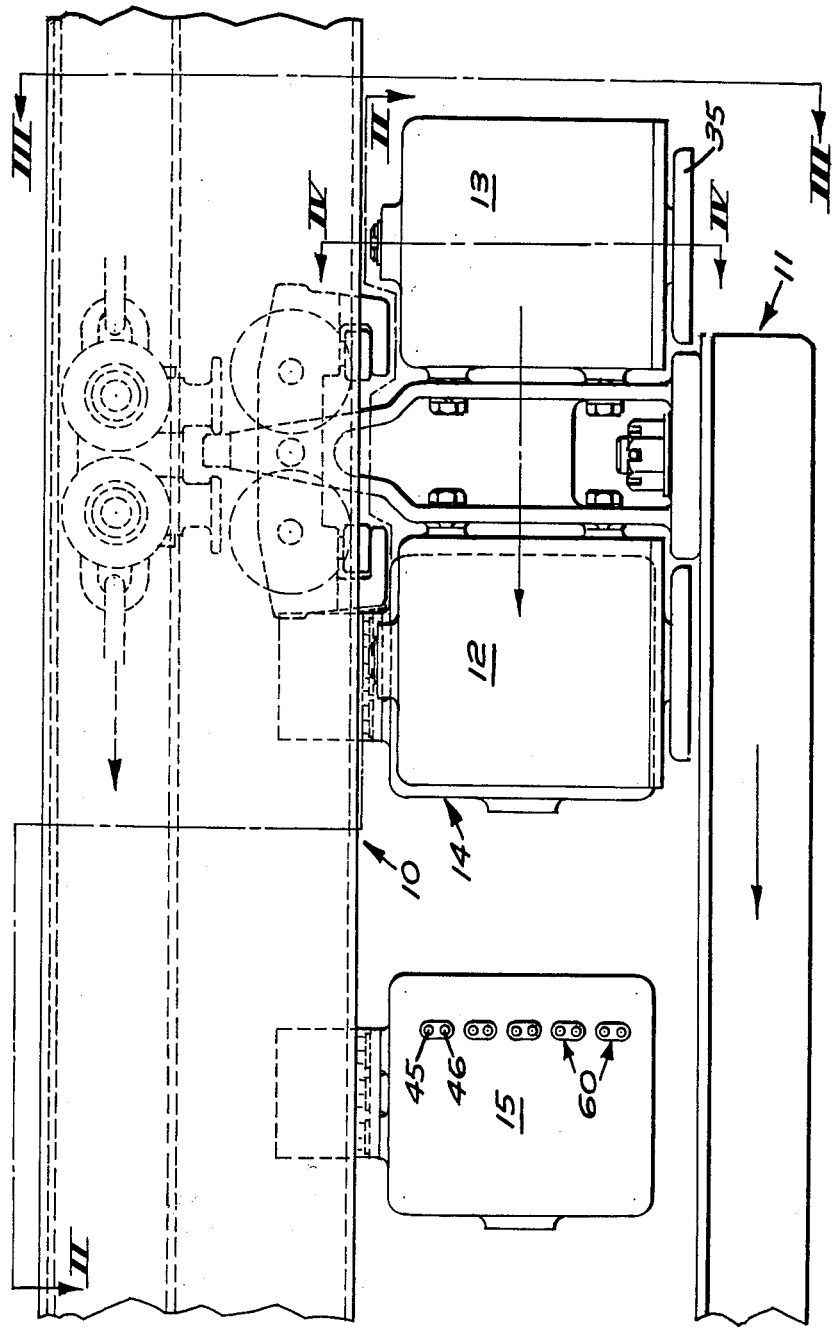
INVENTOR:
HUMPHREY F. PARKER
BY:
Beau, Brooks, Buckley & Beau,
ATTORNEYS.

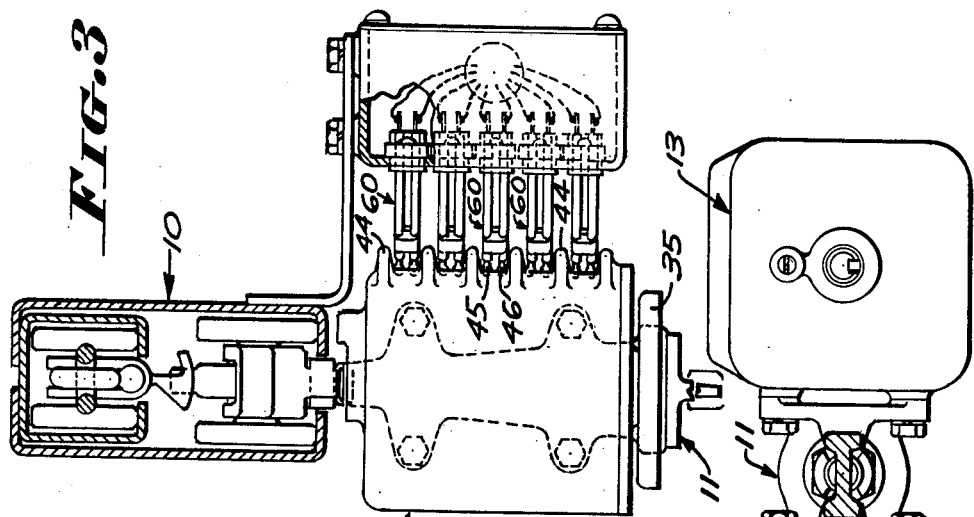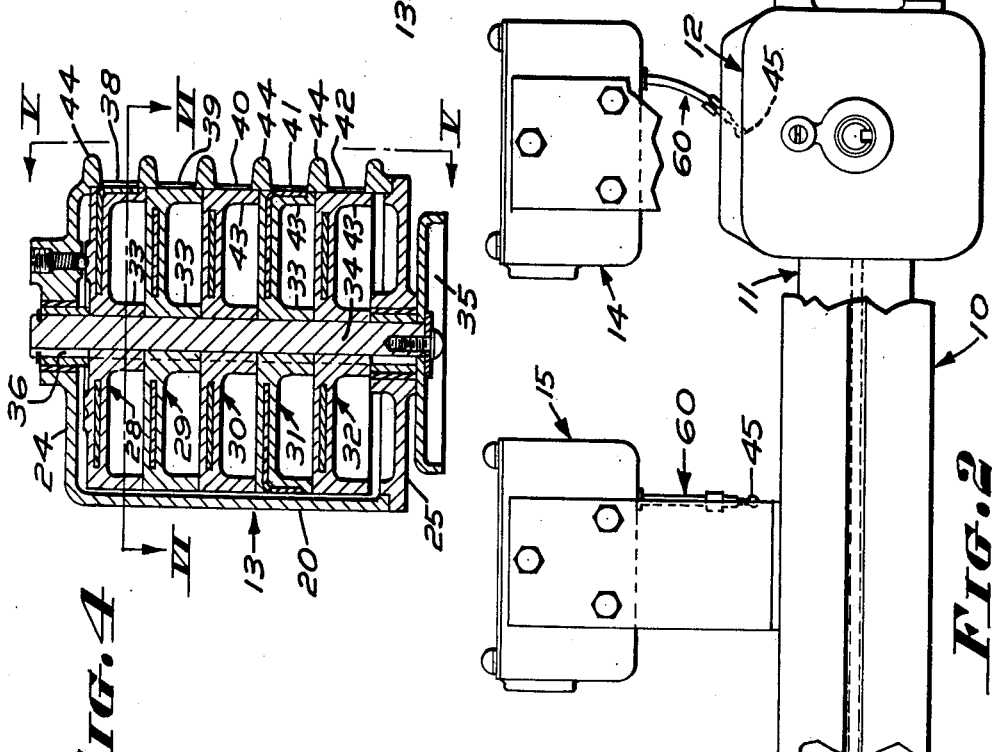

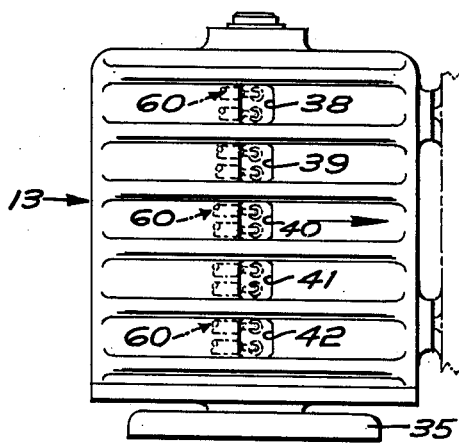
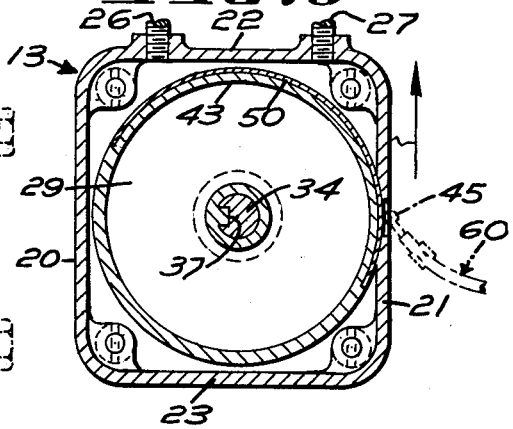
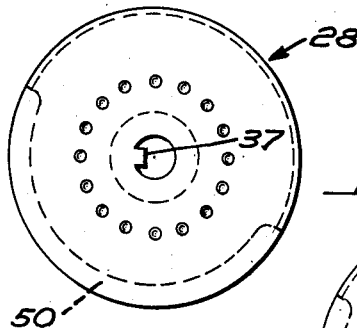
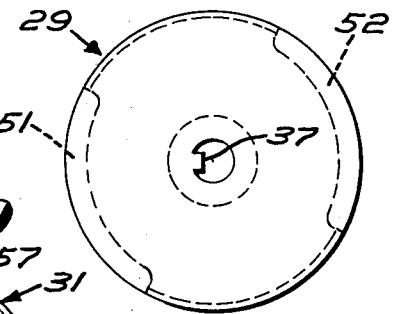
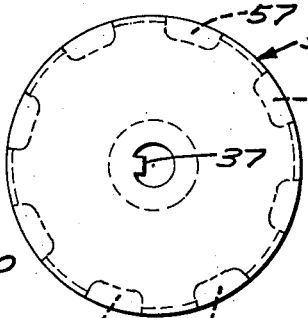
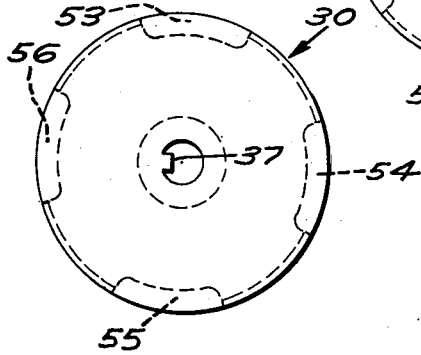
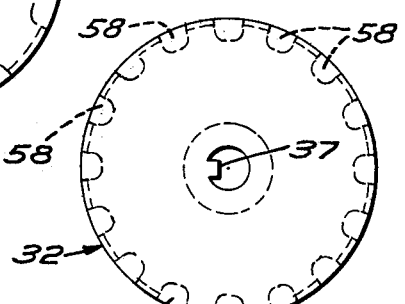

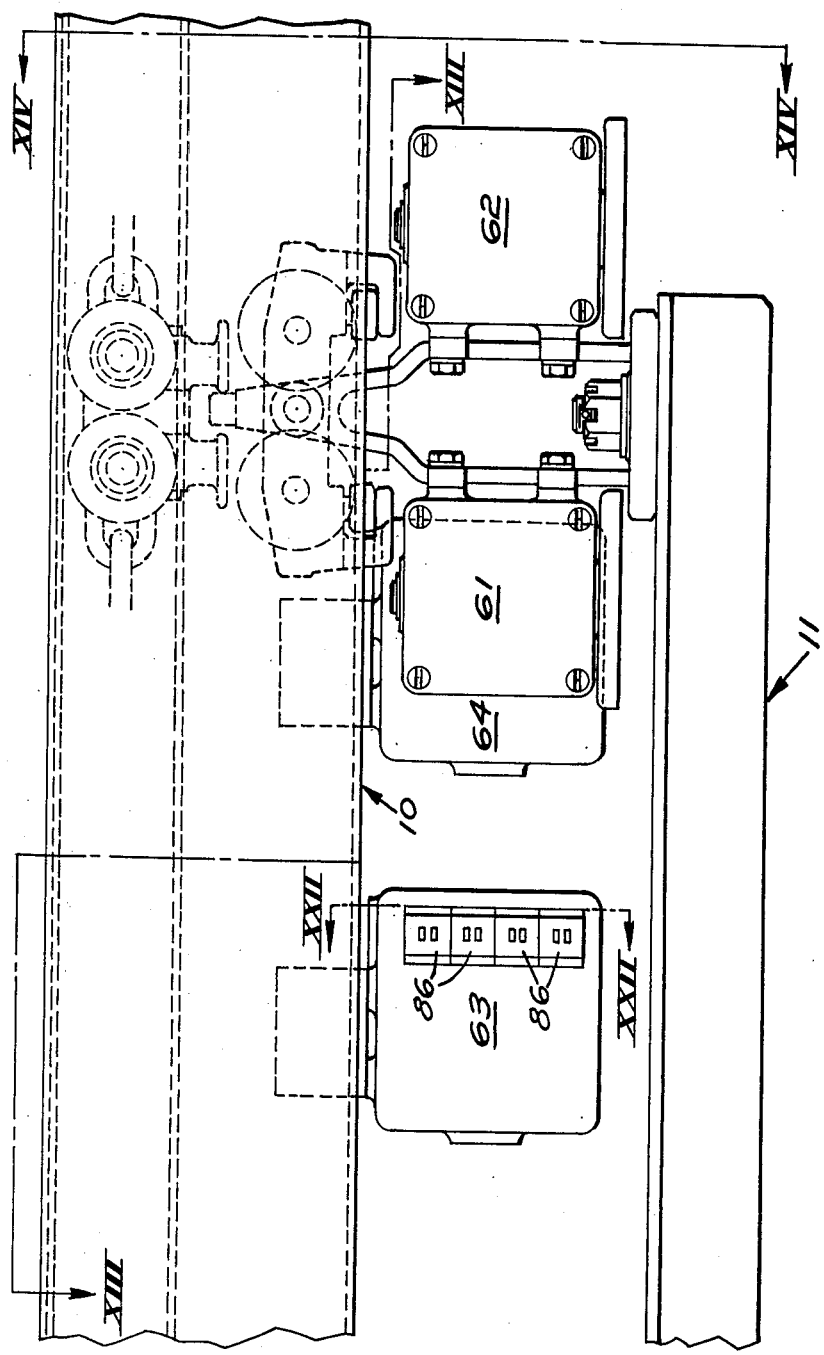

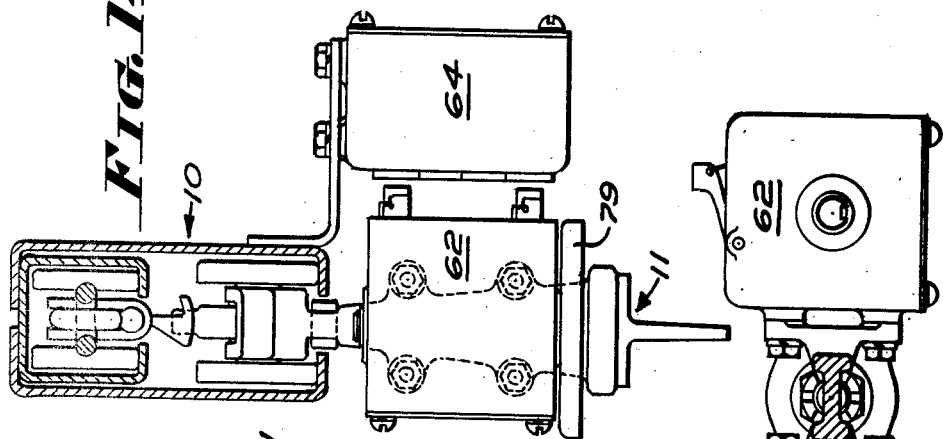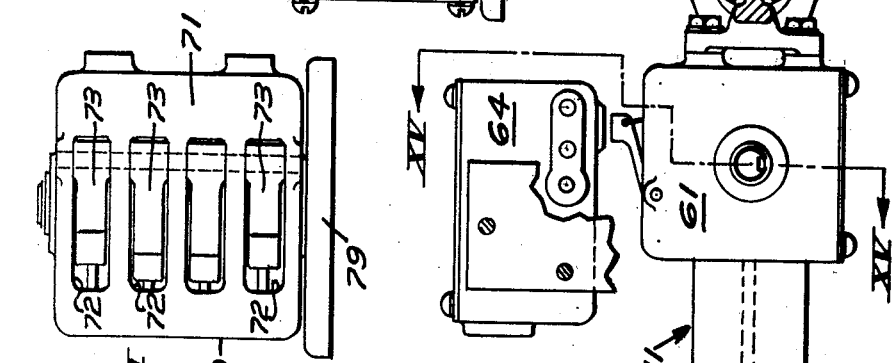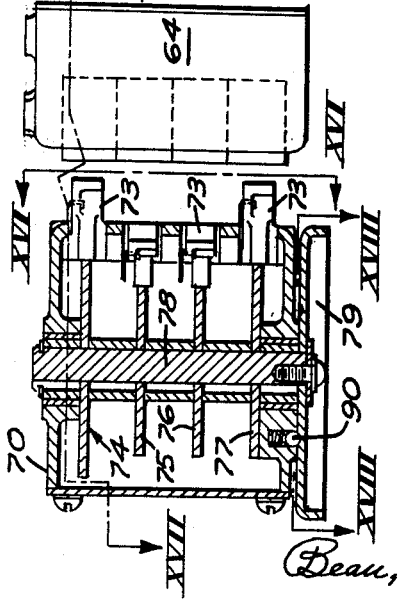

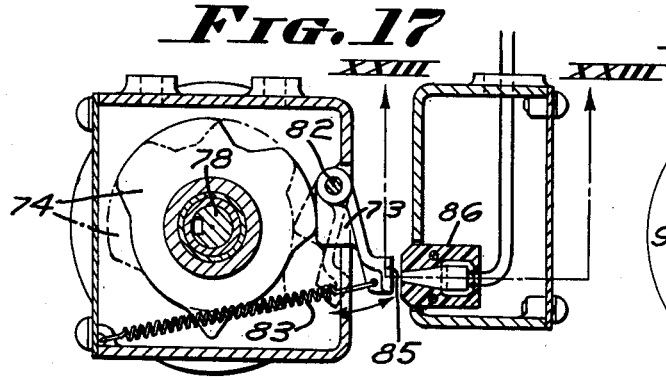
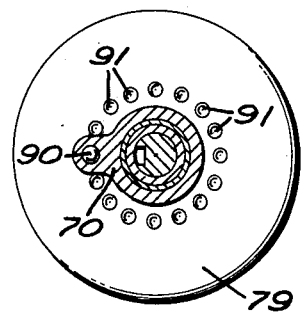
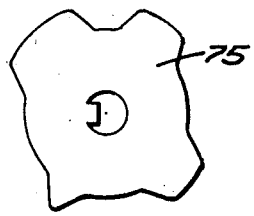
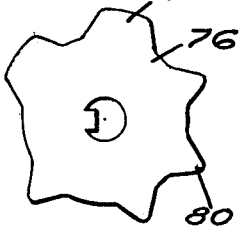
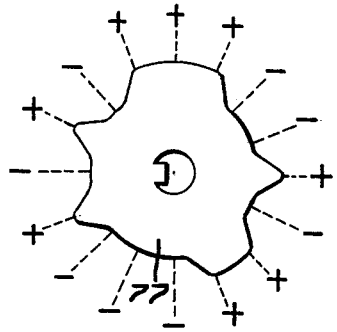
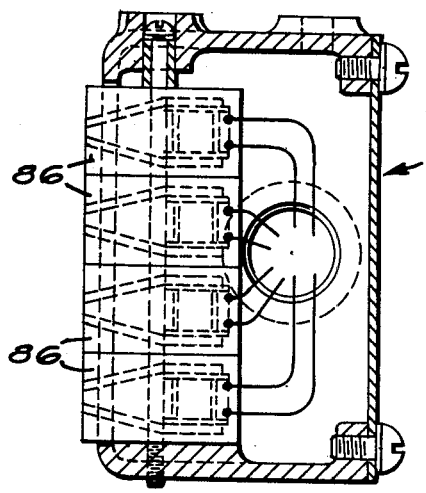
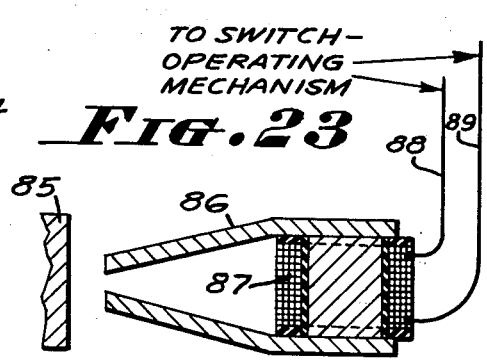

United States Patent Office 3,182,140
Patented May 4, 1965

3,182,140
CODING UNIT FOR CONVEYOR SYSTEMS WITH READOUT MECHANISM
Humphrey F. Parker, Buffalo, N.Y., assignor to Columbus McKinnon Corporation, Tonawanda, N.Y.
Filed May 5, 1960, Ser. No. 27,133
3 Claims. (Cl. 200—9)

This invention relates to improvements in encoding mechanisms and pertains more particularly to modified actuating mechanisms for use in conjunction with systems in accordance with my copending application titled Conveyor Dispatch System, Serial No. 27,132 filed May 5, 1960, now Patent No. 3,140,669 issued July 14, 1964.

In conveyor systems utilizing a large number, say five or more, switch levels in the readout mechanisms in order to achieve a greater number of programming and selecting combinations, the vertical height occupied by the total number of switch levels becomes an important consideration. Naturally, it is desirable to occupy as little vertical space as is possible and it is primarily to this end that the present invention is directed. Additionally, the greater the number of switch levels used, and consequently the greater number of combinations available with such levels, the more minute the angular adjustment between encoding points becomes. For example, with say only three switch levels, the total number of combinations is eight so that the angular displacement between encoding stations is 45°. However, with five switch levels, the number of combinations is thirty-two, leaving only 11¼° between encoding stations. It is therefore a further object of this invention to provide certain improvements in encoders of this character which will enable accurate switch actuation when very little angular displacement between coding stations is available.

FIG. 1 is an elevational view showing a portion of a conveyor system and illustrating the disposition of the encoding means and the readout mechanism;

FIG. 2 is a horizontal section taken generally along the plane of section line II—II in FIG. 1;

FIG. 3 is a vertical section taken along section line III—III in FIG. 1;

FIG. 4 is an enlarged vertical section taken along section line IV—IV in FIG. 1 illustrating details of the encoder mechanism;

FIG. 5 is an elevation of the encoding mechanism as indicated by line V—V in FIG. 4;

FIG. 6 is a horizontal section through the encoding mechanism as indicated by section line VI—VI in FIG. 4;

FIGS. 7-11 are plan views of the five contact drums used;

FIG. 12 is a view similar to FIG. 1 but illustrating a modified form of the invention;

FIG. 13 is a horizontal section taken along section line XIII—XIII in FIG. 12;

FIG. 14 is a vertical section taken along section line XIV—XIV in FIG. 12;

FIG. 15 is an enlarged vertical section taken along section line XV—XV in FIG. 13 showing details of the internal construction of the modified encoder;

FIG. 16 is an elevation as indicated by line XVI—XVI in FIG. 15;

FIG. 17 is a horizontal section taken through the modified encoder as indicated by section line XVII—XVII in FIG. 15;

FIG. 18 is a horizontal section taken along the plane of section line XVIII—XVIII in FIG. 15 illustrating the means by which the encoding cams are held in adjusted position;

FIGS. 19-21 are plan views of three of the encoding cams, the fourth being illustrated in FIG. 17;

FIG. 22 is a vertical section through a readout mechanism, as indicated by section line XXII—XXII in FIG. 12; and FIG. 23 is an enlarged section taken along section line XXIII—XXIII in FIG. 17 illustrating details of one of the readout pickups.

The system as shown in FIGS. 1-3 includes an overhead monorail 10 capable of moving a plurality of trolleys, one of which is indicated by reference character 11. Each trolley carries a pair of encoding mechanisms 12 and 13 which are cooperable with readout mechanisms such as those indicated by reference characters 14 and 15 disposed at requisite points throughout the system.

The system itself is of the type including a main line having a plurality of subsidiary branch lines with further subsidiary or secondary lines branching from the first mentioned subsidiaries, and so on, as is required for the particular system involved. Remote from the main line, there are subsidiary lines which contain a number of storage or unloading stations. Each trolley is programmed or routed to a particular such subsidiary by means of the encoder 12 carried thereby, whereafter the encoder 13 is used to select the particular branch track to which the trolley is destined, all as is more specifically set forth in the above mentioned copending application.

The encoder shown in FIGS. 4-6 includes a housing having opposite side walls 20 and 21, end walls 22 and 23, as well as top and bottom walls 24 and 25.

End wall 22, see FIG. 6, may be used to secure the encoder to the trolley, as by any suitable fastening means 26 and 27 so that side wall 21 faces the readout mechanisms as the trolley moves therepast. Enclosed by the encoder housing in vertically stacked relation to each other are a series of contact drums 28, 29, 30, 31 and 32, each of cylindrical configuration having a central boss 33 receiving a vertical shaft 34 which extends through the top and bottom wall 24 and 25 and is journalled therein so that the drums may be rotated in unison to a desired position. The lower end of shaft 34 carries a dial 35 keyed to shaft 34 so as to be non-rotatable relative thereto and by means of which the shaft may be turned. It will be noted that shaft 34 is provided with a longitudinal keyway 36 receiving tongues 37 in the bosses of the drums (see FIGS. 7-11) so that the drums are also non-rotatably fixed to the shaft.

The housing side wall 21 which faces the readout mechanisms is provided with a series of apertures 38, 39, 40, 41 and 42 opposite the peripheral flanges 43 of the drums to provide access windows thereto, the purpose of which will be presently apparent. Horizontally extending guide strips 44 bound the upper and lower extremities of the windows which serve to channel the probes 45 and 46 of the readout mechanisms into contact with the proper drums through the access windows.

Each drum presents, on the outer surface of its peripheral flange, discrete electrical conducting areas corresponding to the various different combinations of switching available. Since there are five drums used with five switch levels in each readout assembly, there are thirty-two possible switch combinations. For example, designating the levels A, B, C, D and E, some of the combinations would be AB, AC, ABE, ACDE and so on. Naturally, in order to achieve all of these combinations, there must be thirty-two different rotational positions of the drums. To achieve all of the combinations, each drum must be operative to produce a switching operation in sixteen of these positions.

The drums themselves are operative when an electrical conductive area thereof is opposite its access window, thus completing an electrical circuit through the corresponding probes 45 and 46. For this purpose, it will be seen that half the periphery of drum 28 is continuously provided with conductive area as by the metal strip 50. Similarly drum 29 is provided with diametrically opposed, quarter circumferential metal strips 51 and 52. Drum 30 is provided with four equidistantly spaced metal strips 53, 54, 55 and 56, each occupying ⅛ of the drum circumference. Drum 31 is provided with eight metal strips 57, each approximately ¹⁄₁₆ of the drum circumference in length. Lastly, drum 32 is provided with sixteen equidistantly spaced metal strips 58, each approximately ¹⁄₃₂ of the drum circumference in length. It will be noted that those strips which for example cover ¼ of a drum circumference are operable in four successive drum positions to present conductive areas behind the associated window while those ¹⁄₁₆ of a drum circumference are operable in two successive drum positions, and so on.

By providing the conductive areas of the drums as above specified, all thirty-two possible combinations of switching are possible. There are five probe assemblies 60, one associated with each drum, and each such assembly includes two probe elements 45 and 46 maintained in spaced apart relation and operative when bridged by a metal strip on a drum surface to actuate suitable mechanism for routing the trolley or for halting its movement, as the case may be.

The modified mechanism as shown in FIGS. 12-14 is identical to that previously described except for details of the encoding and readout mechanisms and the fact that only four switch levels are used. The actual operation of the readout mechanisms is effected magnetically in the modified construction. In FIGS. 12-14, the encoding mechanisms are indicated by reference characters 61 and 62 while the readout mechanisms are indicated as 63 and 64.

Referring now more particularly to FIGS. 15 and 16, the encoding mechanism comprises a housing 70, one side wall 71 of which is provided with elongate windows 72 through which a plurality of levers 73 are swingable between retracted and extended positions under the influence of cams 74, 75, 76 and 77. These cams are carried by the vertical shaft 78 carrying the dial 79 at its lower end for rotating the cams to the desired positions.

Each of the cams, as can be seen in FIGS. 17-21, is of different profile, each having a plurality of projections such as those shown at 80 and 81 in FIG. 20 which correspond to one or more operative coding positions. The number of operative projection positions on each cam is eight, half the total number of possible combinations with four levels of switches.

As seen in FIG. 17, when any given cam is in operative position, its associated lever 73 is extended by virtue of its engagement by the cam to pivot the same about pivot pin 82. Tension spring 83 is operative to normally urge each lever to retracted position. FIG. 21 illustrates the sixteen possible positions, the marks — indicating retracted lever positions in which the corresponding switch level will not be operated and the marks + indicating projected lever positions and corresponding switch actuation. The free end 85 of each lever is magnetic so that as it passes the corresponding sensing unit 86 (see FIG. 23) of the readout mechanism, the sensing unit coil 87 will be excited to effect an induced E.M.F. in the conductors 88 and 89 and actuate the necessary mechanism to produce the desired effect.

To hold the cams in the desired positions, the housing 70 carries a spring pressed ball 90 into one of the pockets 91 in the upper face of dial 79, see FIGS. 15 and 18. A similar arrangement, acting on the uppermost drum 28 in the first described embodiment achieves the same result.

I claim:
1. A coding unit for conveyor systems comprising a housing provided with a vertical shaft therein, means rotatably mounting said shaft within said housing, means affixed to said shaft externally of said housing for rotating said shaft to any one of a number of a predetermined fixed positions, a plurality of stacked coding members fixed to said shaft within said housing and rotatable in unison with said shaft, each coding member having actuating means disposed peripherally thereof within discrete areas and with the disposition of such means being different on each of said coding members from all of the other coding members, and with such discrete areas being disposed in predetermined vertical alignments corresponding in number to all of the possible combinations obtainable by such plurality of coding members, and a readout mechanism disposed adjacent to and separate from said coding assembly, the readout mechanism being engageable with any combination of said coding members in response to relative movement between said housing and said readout mechanism, each of said coding members being in the form of a drum with the stated discrete area thereof comprising metallic strips while the remainder of said drum in the peripheral area thereof is electrically nonconducting material.

2. A coding unit for conveyor systems comprising a housing provided with a vertical shaft therein, means rotatably mounting said shaft within said housing, means affixed to said shaft externally of said housing for rotating said shaft to any one of a number of a predetermined fixed positions, a plurality of stacked coding members fixed to said shaft within said housing and rotatable in unison with said shaft, each coding member having actuating means disposed peripherally thereof within discrete areas and with the disposition of such means being different on each of said coding members from all of the other coding members, and with such discrete areas being disposed in predetermined vertical alignments corresponding in number to all of the possible combinations obtainable by such plurality of coding members, and a readout mechanism disposed adjacent to and separate from said coding assembly, the readout mechanism being engageable with any combination of said coding members in response to relative movement between said housing and said readout mechanism, each of said coding members being in the form of a drum with the stated discrete area thereof comprising metallic strips while the remainder of said drum in the peripheral area thereof is electrically nonconducting material, said readout assembly including a plurality of vertically spaced probe units each having a pair of spaced naked probes engageable with respective ones of said drums for completion of a circuit between such probes upon engagement with a metallic strip portion on a respective drum.

3. A coding unit for conveyor systems comprising, in combination,
   a housing provided with a vertical shaft therein,
   means rotatably mounted said shaft within said housing,
   a plurality of stacked coding members fixed to said shaft within said housing and rotatable in unison with said shaft, each coding member having actuating means disposed peripherally thereof within discrete areas and with the disposition of such means being different on each of said coding members from all of the other coding members, and with such discrete areas being disposed in predetermined vertical alignments corresponding in number to all of the possible combinations obtainable by such plurality of coding members,
   a readout mechanism disposed adjacent to and separate from said housing, said readout mechanism including a plurality of sensing members, one for each of said coding members, and said sensing members being vertically spaced in vertical registry and in horizontal alignment with corresponding ones of said coding members, and means affixed to said shaft externally of said housing for presenting a selected one of said vertical alignments of the coding members in opposed relation to said sensing members in response to relative movement between said housing and said readout mechanism.

References Cited by the Examiner
UNITED STATES PATENTS

| | | | |
|---|---|---|---|
| 2,085,884 | 7/37 | Wilkinson | 340—357 X |
| 2,319,450 | 5/43 | Gould et al. | 200—26 |
| 2,585,420 | 2/52 | Ailes. | |
| 2,799,740 | 7/57 | Blackman | 200—14 |
| 2,835,042 | 5/58 | Tandler et al. | 200—9 X |

BERNARD A. GILHEANY, *Primary Examiner.*

MAX L. LEVY, *Examiner.*